US012157275B2

United States Patent
Moran et al.

(10) Patent No.: US 12,157,275 B2
(45) Date of Patent: *Dec. 3, 2024

(54) METHODS OF CALIBRATION OF A STEREOLITHOGRAPHY SYSTEM

(71) Applicants: Lawrence Livermore National Security, LLC, Livermore, CA (US); 3D SYSTEMS, INC., Houston, TX (US)

(72) Inventors: Bryan D. Moran, Livermore, CA (US); Brian J. Bauman, Livermore, CA (US); Matthew Kenneth Gelber, Houston, TX (US); Jordan Miller, Houston, TX (US)

(73) Assignee: Lawrence Livermore National Laboratory and 3D Systems, Inc.

( * ) Notice: Subject to any disclaimer, the term of this patent is extended or adjusted under 35 U.S.C. 154(b) by 27 days.

This patent is subject to a terminal disclaimer.

(21) Appl. No.: 17/729,077

(22) Filed: Apr. 26, 2022

(65) Prior Publication Data

US 2022/0339883 A1 Oct. 27, 2022

Related U.S. Application Data

(60) Provisional application No. 63/179,876, filed on Apr. 26, 2021.

(51) Int. Cl.
*B33Y 10/00* (2015.01)
*B29C 64/124* (2017.01)
(Continued)

(52) U.S. Cl.
CPC .......... *B29C 64/393* (2017.08); *B29C 64/124* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 4,575,330 A | 3/1986 | Hull |
| 4,834,540 A | 5/1989 | Totsuka et al. |

(Continued)

FOREIGN PATENT DOCUMENTS

| EP | 2646223 | 6/2017 |
| EP | 3708369 | 9/2020 |

(Continued)

OTHER PUBLICATIONS

International Search Report in corresponding PCT Application No. PCT/US2022/026187, mailed Aug. 10, 2022.
(Continued)

*Primary Examiner* — Yung-Sheng M Tsui
*Assistant Examiner* — Melody Tsui
(74) *Attorney, Agent, or Firm* — Norton Rose Fulbright US LLP

(57) ABSTRACT

Provided herein is a system for producing a product. The system generally comprises a large-area micro-stereolithography system, an optical imaging system, and a controller in communication with the large-area micro-stereolithography system and the optical imaging system. The large-area micro-stereolithography system is capable of generating the product by optically polymerizing successive layers of a curable resin at a build plane. The controller is capable of analyzing a focus level of the reference target based on the captured image; and based on the analyzing, adjusting a focus property of the projected image beam of the stereolithography system.

5 Claims, 13 Drawing Sheets

(51) Int. Cl.
   *B29C 64/393*     (2017.01)
   *B33Y 30/00*      (2015.01)
   *B33Y 50/02*      (2015.01)

(56) References Cited

U.S. PATENT DOCUMENTS

| | | | |
|---|---|---|---|
| 5,059,021 | A | 10/1991 | Spence et al. |
| 5,902,537 | A | 5/1999 | Almquist et al. |
| 5,976,448 | A | 11/1999 | Haruta et al. |
| 6,200,646 | B1 | 3/2001 | Neckers et al. |
| 6,246,706 | B1 | 6/2001 | Kafka et al. |
| 6,505,089 | B1 | 1/2003 | Yang et al. |
| 6,833,234 | B1 | 12/2004 | Bloomstein et al. |
| 7,088,432 | B2 | 8/2006 | Zhang |
| 7,783,371 | B2 | 8/2010 | John et al. |
| 8,636,496 | B2 | 1/2014 | Das et al. |
| 8,660,825 | B2 | 2/2014 | Kumar |
| 8,666,142 | B2 | 3/2014 | Shkolnik et al. |
| 9,930,307 | B1 † | 3/2018 | Kursula |
| 10,611,093 | B2 | 4/2020 | Frantzdale et al. |
| 10,723,078 | B2 | 7/2020 | Cooper |
| 11,192,294 | B2 | 12/2021 | Cooper et al. |
| 11,196,876 | B2 | 12/2021 | Chen et al. |
| 11,390,036 | B2 | 7/2022 | Winter |
| 2003/0173713 | A1 | 9/2003 | Huang |
| 2005/0007671 | A1 | 1/2005 | Onvlee |
| 2007/0075460 | A1 | 4/2007 | Wahlstrom et al. |
| 2008/0223721 | A1 | 9/2008 | Cohen et al. |
| 2010/0125356 | A1 | 5/2010 | Shkolnik et al. |
| 2011/0033887 | A1 | 2/2011 | Fang et al. |
| 2011/0259862 | A1 | 10/2011 | Scott et al. |
| 2012/0251829 | A1 | 10/2012 | Xu et al. |
| 2013/0171431 | A1 | 7/2013 | Swartz et al. |
| 2014/0081190 | A1 | 3/2014 | Summit et al. |
| 2014/0353848 | A1 | 12/2014 | Park et al. |
| 2014/0353878 | A1 | 12/2014 | Driessen et al. |
| 2015/0100149 | A1 | 4/2015 | Coeck et al. |
| 2016/0033877 | A1 | 2/2016 | Smilde |
| 2016/0303797 | A1 | 10/2016 | Moran |
| 2016/0311160 | A1 | 10/2016 | Nam et al. |
| 2017/0136708 | A1 | 5/2017 | Das et al. |
| 2017/0291355 | A1 | 10/2017 | Zhang |
| 2017/0353878 | A1 | 12/2017 | Yamada |
| 2017/0355147 | A1 | 12/2017 | Buller et al. |
| 2018/0056590 | A1 | 3/2018 | Costabeber |
| 2018/0141268 | A1 | 5/2018 | Holt |
| 2018/0207887 | A1 | 7/2018 | Hsu |
| 2018/0215093 | A1 | 8/2018 | Chimmalgi |
| 2018/0322621 | A1 * | 11/2018 | Craeghs .................. G06T 7/001 |
| 2018/0341184 | A1 | 11/2018 | Hundley et al. |
| 2018/0370148 | A1 | 12/2018 | Sekine et al. |
| 2019/0053883 | A1 | 2/2019 | Sun et al. |
| 2019/0160465 | A1 | 5/2019 | Toner et al. |
| 2019/0210289 | A1 * | 7/2019 | FrantzDale .......... G01B 11/002 |
| 2019/0329494 | A1 | 10/2019 | Linnell et al. |
| 2019/0358902 | A1 | 11/2019 | Slaczka et al. |
| 2019/0366630 | A1 | 12/2019 | Oikonomopoulos et al. |
| 2020/0001533 | A1 | 1/2020 | Packirisamy et al. |
| 2020/0122404 | A1 | 4/2020 | Roblin et al. |
| 2020/0139630 | A1 | 5/2020 | Prucha |
| 2020/0215760 | A1 | 7/2020 | Wijn et al. |
| 2020/0223135 | A1 | 7/2020 | Shutzberg et al. |
| 2020/0282640 | A1 | 9/2020 | John |
| 2020/0292415 | A1 | 9/2020 | Goldman et al. |
| 2021/0016394 | A1 † | 1/2021 | McCarthy |
| 2021/0078251 | A1 | 3/2021 | Damiano et al. |
| 2022/0048256 | A1 * | 2/2022 | Michalica ............. B29C 64/232 |
| 2022/0111584 | A1 | 4/2022 | Moran |
| 2022/0266508 | A1 | 8/2022 | Medalsy |
| 2022/0339858 | A1 | 10/2022 | Heidari et al. |
| 2022/0339882 | A1 | 10/2022 | Gelber et al. |

FOREIGN PATENT DOCUMENTS

| | | | |
|---|---|---|---|
| JP | 2004223792 | † | 8/2004 |
| JP | 2004223792 A | * | 8/2004 |
| WO | 2016115369 | † | 7/2016 |
| WO | WO 2017/085470 | | 5/2017 |
| WO | WO 2019/028215 | | 2/2019 |

OTHER PUBLICATIONS

International Search Report in corresponding PCT Application No. PCT/US2022/026194, mailed Jul. 29, 2022.

International Search Report in corresponding PCT Application No. PCT/US2022/026196, mailed Jul. 25, 2022.

International Search Report and Written Opinion for PCT/US2016/020971, dated Jul. 11, 2016.

Zheng el. al., "Ultralight, Ultrastiff Mechanical Metamaterials," Science (www.sciencemag.org), vol. 344, No. 6190, 2014, pp. 1373-1377.

Zhou et al. "Additive manufacturing based on optimized mask video projection for improved accuracy and resolution" Journal of Manufacturing Processes 14 (2012) 107-118.

Office Action issued in corresponding U.S. Appl. No. 17/729,061, dated Mar. 6, 2023.

Emani et al. "Scanning-projection based stereolithography: Method and structure" Sensors and Actuators A 218 (2014) 116-124 (Year: 2014).

Final Office Action issued in corresponding U.S. Appl. No. 17/729,047, dated Jan. 8, 2024.

Office Action issued in corresponding U.S. Appl. No. 17/456,084, dated Dec. 11, 2023.

\* cited by examiner
† cited by third party

METHODS OF CALIBRATION OF A STEREOLITHOGRAPHY SYSTEM

CROSS-REFERENCE TO RELATED APPLICATIONS

This application is a non-provisional application claiming the benefit under 35 U.S.C. 119(e) of U.S. Provisional Application No. 63/179,876, filed on Apr. 26, 2021, the disclosure of which is incorporated herein by reference in its entirety.

STATEMENT REGARDING FEDERALLY SPONSORED RESEARCH

This invention was made with Government support under Contract No. DE-AC52-07NA27344 awarded by the United States Department of Energy. The Government has certain rights in the invention.

TECHNICAL FIELD

The subject matter described herein relates to an optically calibrated large area microstereolithography system for producing a product, with associated apparatus and methods. This microstereolithography system has particular but not exclusive utility for 3D printing of parts.

BACKGROUND

The concept of microstereolithography is used in rapid prototyping and small-scale production of plastic components and other complex 3D objects. An object is generated within a fluid medium by selective curing of the medium with beams of radiation focused in a build plane or print plane located at or near the medium's surface. A 3D model (e.g., produced using CAD software, 3D scanning, or by other means) may be subdivided into 2D slices, and each slice may be subdivided into regions. A projection apparatus can then expose an image of each region into an equivalent region of the build plane. This permits extremely high-resolution exposures, with voxels only a few tens of microns in size, across areas as large as several hundred millimeters or more. The exposed layers are then lowered into the medium with an elevator system, such that a new layer can be exposed in the now-empty build plane. In this manner, large forms can be built up rapidly, reliably, and repeatably, until a completed 3D object is produced. Such principles are described for example in U.S. Patent Publication No. 2016/0303797 to Moran, hereby included by reference as though fully set forth herein.

However, such microstereolithography systems have numerous drawbacks, including unwanted variations in beam focus and intensity across the build plane, and otherwise, that can degrade the resolution and/or beam registration of the system, resulting in lower-quality parts. Accordingly, long-felt needs exist for improved microstereolithography systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is an optically calibrated, large area microstereolithography (OCLAuSL) system that includes an optic system, a spatial light modulator (SLM), a beam delivery system, a bath of curable resin, an elevator system within the bath, and an optical imaging system. A 3D model (e.g., a CAD model or 3D image) of an object is subdivided into slices and slice regions. Each slice region is projected onto a corresponding region of a build plane or print plane near the surface of the curable resin bath, thus cross-linking the exposed regions into a solid polymer, until the desired voxels of the entire build plane are exposed. The elevator then lowers, bringing fresh resin into the build plane so that a new layer can be exposed. New layers are fabricated until a completed 3D object is created. Because the build plane or print plane is subdivided into multiple regions, the resolution of each exposure can be very high (e.g., voxel sizes of tens of microns or smaller), while the build plane can potentially be quite large (e.g., hundreds of millimeters or larger). The optical imaging system is used to image the build plane and calibrate the optics of the microstereolithography system, thus ensuring consistent registration, exposure, and image resolution across the entire build plane. This process is not limited to top-down printing. The projection can also be done through a window, upward into the vat, and the build platform raised for each subsequent layer.

The optically calibrated microstereolithography system disclosed herein has particular, but not exclusive, utility for 3D printing of useful objects.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the optically calibrated microstereolithography system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
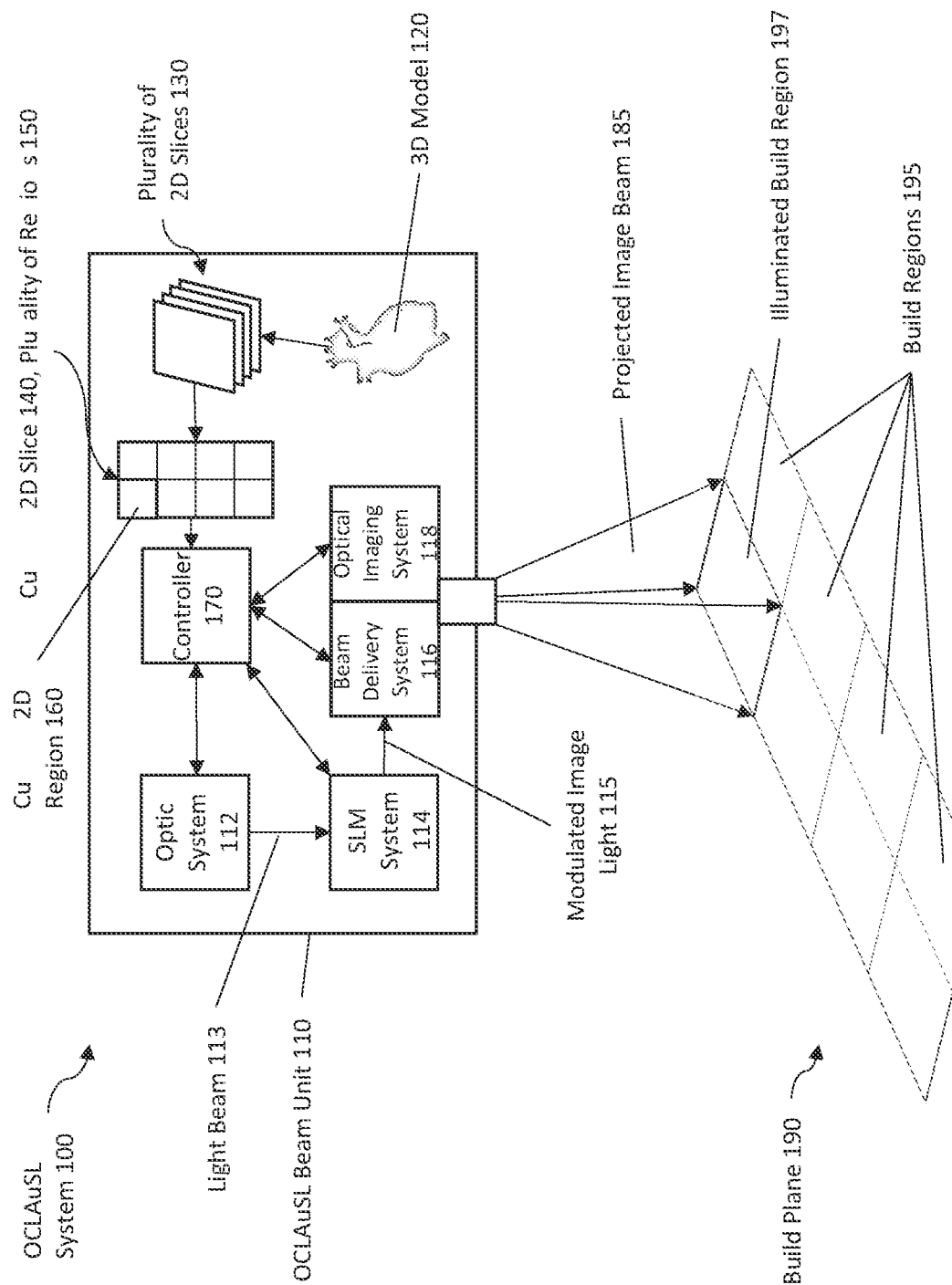
FIG. 1 is a schematic representation of at least a portion of an example optically calibrated, large-area microstereolithography (OCLAuSL) system, in accordance with at least one embodiment of the present disclosure.

In accordance with at least one embodiment of the present disclosure, an optically calibrated, large area microstereolithography system is provided which can be used for rapid manufacturing of complex, macroscopic three-dimensional components with microscopic features. The system uses a spatial light modulator (SLM) such as a liquid crystal display (LCD) screen or digital micromirror display (DMD), in coordination with a scanning optical projection system, to produce large, detailed objects through microstereolithography. A 3D computer model is subdivided into slices, each slice is subdivided into regions, and each region is communicated to the SLM to form an image. The SLM image is then projected onto a photosensitive liquid (e.g., resin) that cross-links or otherwise hardens as a result of the radiation exposure. This projection is accomplished with a scanning optical system that can direct the SLM image to different build regions of a build plane or print plane that is much larger than the SLM image itself. The imaging of new model regions on the SLM is coordinated with the optical system such that each image is directed to an appropriate portion of the build plane, with imaged model regions and build plane projection locations changing either discretely (e.g., flash-and-move imaging) or continuously. Using beam-directing optics, the projection is moved to a new position on the build plane as the SLM pattern is updated, to create a large, continuous image in the photosensitive fluid—much larger than a single SLM image. This enables very large parts or products to be fabricated which nevertheless have small feature sizes. In this manner, a single microstereolithography system covers a significant area. However, multiple microstereolithography systems can also be combined together so that their build planes cover an ever-larger area, to fabricate even larger items. By coordinating the SLM images and scanning optics of two or more microstereolithography systems, a single processor or controller can generate the necessary patterns across the combined build plane, which can be increased to any arbitrary size through the inclusion of additional microstereolithography systems.

The OCLAuSL system also includes an optical imaging system. The optical imaging system can be used to image the build plane. More particularly, the optical imaging system can image an item within the build plane such as a reference component or test pattern, or a mirror or other reference target with known optical properties. A CPU, processor, or controller can then analyze the image or images of the build plane, and make adjustments to parameters of the optic system such as brightness or focus, or parameters of the SLM such as grayscale properties of the SLM image, or parameters of the beam delivery system such as focus, image positioning, etc. In this way the optical imaging system can be used to calibrate the microstereolithography system either before fabrication of a new product, or in real time or near-real time during fabrication of the product.

As with other stereolithography systems, the volumetric rate of polymerization (volume turned from liquid to solid per unit time) may be determined at least in part by the critical energy of the resin and the total power of the polymerizing light. For example, some embodiments of the system described herein may be capable of polymerizing resin at rates on the order of several liters per hour, although faster and slower rates are also contemplated.

The OCLAuSL systems, apparatus, and methods can rapidly fabricate large items (e.g., tens, hundreds, or thousands of millimeters in size, or other sizes both larger and smaller) with high-resolution features (e.g., voxel sizes of tens of microns or smaller—comparable to the scale of human cells) that are consistent across the area or volume of the product. In some cases, fabricated items can be used as-is as completed products. In other cases, fabricated items can then be used as molds or masters for casting, blow molding, injection molding, thermoforming, and other fabrication processes for polymer, metal, or ceramic objects.

Because the fabricated object or product is ultimately constructed of voxels (e.g., three-dimensional pixels), its structure may appear "pixelated" when viewed on a fine enough scale. However, it is an advantage of the present disclosure that such pixelation may occur on a scale too fine to be perceived by the human eye.

This ability to make consistently fine-featured items with large volume or cross-sectional area distinguishes the OCLAuSL systems, apparatus, and methods from other techniques, and facilitates the rapid fabrication not only of prototypes, but of finished, customized small-production-run products for individual customers. The photocurable medium may also include particles of metal, ceramic, or other materials (e.g., wood), allowing for the production of composite parts, and/or the removal of polymer and (for example) sintering of metallic or ceramic components, thus enabling the production of purely metallic or ceramic parts.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the optically calibrated, large-area microstereolithography system. Certain features may be added, removed, or modified without departing from the spirit of the claimed subject matter.

FIG. 1 is a schematic representation of at least a portion of an example optically calibrated, large-area microstereolithography (OCLAuSL) system 100, in accordance with at least one embodiment of the present disclosure. The OCLAuSL system 100 includes an OCLAuSL beam unit 110 that projects an image beam 185 onto a build plane 190.

The OCLAuSL beam unit 110 includes an optic system 112 that generates a beam of light 113, which is then cast through or onto a spatial light modulator (SLM) system 114 that generates an image. The SLM system may for example be a liquid crystal display (LCD) screen through which the beam 113 passes, or a digital micromirror display (DMD) from which the beam 113 reflects, or one or more spinning discs with apertures (as in spinning disc confocal microscopy), or another type of spatial light modulator 114 that serves the purpose of generating modulated image light 115 from the light beam 113. The SLM system may for example have a resolution of 640×480 pixels, 1024×768 pixels, 1920×1080 pixels, or other resolutions both larger and smaller. In some embodiments, the optic system 112 and the SLM system 114 may be combined into a single system. For example, one could directly image an array of light sources, such as a microLED array, to produce modulated image light 115. Regardless of how it is produced, the modulated image light 115 is then passed through a beam delivery system 116, which projects the image beam 185 onto the build plane 190.

The OCLAuSL system 100 also includes a controller, central processing unit (CPU), or processor 170 that is capable of controlling or sending instructions to the optic system 112, SLM system 114, and beam delivery system 116. In some embodiments, one or more of the optic system 112, SLM system 114, or beam delivery system 116 may include its own controller 170, and in some of these embodiments these controllers 170 communicate with one another and/or with a separate controller 170.

The controller 170 includes or receives a 3D model 120 of a desired product. The controller then either divides the 3D model 120 into a plurality of 2D slices 130, or receives the plurality of 2D slices 130 from another source. For example, the 3D model may be divided into 2, 10, 100, 1000, 10,000, 100,000, 1 million, or more slices. Each slice defines a planar cross section through the object or product to be constructed, and can be stored individually (e.g., as a series of BMP, JPEG, or other image files). For an individual slice 140, the controller then either subdivides the 2D slice 140 into a plurality of regions 150 or receives the plurality of regions 150 from another source. In an example, some slices may only have one region, whereas if regions are not overlapped, there may be hundreds of regions, and if regions are overlapped, there could potentially be millions of regions in each slice. Other arrangements are also possible and fall within the scope of the present disclosure.

These regions may also be stored as individual image files in any desired format. From the plurality of regions 150, the controller then selects a current region 160, and sends information about the current region 160 to the SLM system 114, which generates modulated image light 115 from the beam 113, which may be an image of the currently selected region 160 of the current 2D slice 140 of the 3D model 120 of the desired object or product. The modulated image light 115 is then passed through the beam delivery system 116, which may for example expand and focus or shrink and focus the modulated image light 115 into a projected image beam 185, that includes an image of the corresponding portion of the 3D model 120, and thus of the corresponding portion of the desired product. The projected image beam 185 intersects with the build plane 190 such that the image produced by the SLM 114 is focused onto the build plane 190. The projected image beam 185 may include a monochrome (e.g., black and white) image or a grayscale image, or combinations thereof. The brightness or whiteness level of a grayscale pixel may affect the amount of curing of a voxel in the build plane or the exposure time required to fully cure the voxel. A color image may also be used, although in some cases, the color may not affect the curing of the photosensitive resin. In other cases, the color (e.g., wavelength) of a given pixel of the image may affect the amount of curing of a voxel in the build plane or the exposure time required to fully cure the voxel, including cases where one color does not cure the resin at all, and may for example be used to project guide markers onto the build plane that do not affect the object under construction. This modulation of the projected image beam 185 may in some instances be referred to as "dynamic masking".

The build plane 190 is subdivided into a plurality of build regions 195, each corresponding to a region 160 of the plurality of regions 150 of the currently selected 2D slice 140. A currently illuminated build region 197 is exposed by the projected image beam 185 such that photocurable resin in that portion of the build plane can be exposed and solidified by the bright portions of the projected image beam 185, while remaining liquid in the dark portions of the projected image beam 185, as described below. Selection and exposure of image regions 160 and build plane regions 197 may be discrete (e.g., flash-and-move exposure), or may be continuous. In some examples, one could expose at the modulation rate of the spatial light modulator, such as 10-20 kHz, or at video frame rates of 60 Hz, although other rates both larger and smaller may be used instead or in addition.

While sequentially selecting different regions 160 of the plurality of regions 150 of the current 2D slice, the controller 170 generates corresponding images with the SLM 114 and directs the beam delivery system 116 to expose them onto different selected build regions 197 of the plurality of build regions 195 of the build plane 190. In this way, a complete 2D slice of the desired product can be produced in the build plane 190. A completed 3D product can be produced by lowering the product into the photocurable resin bath with an elevator system, and sequentially exposing each 2D slice 140 of the plurality of 2D slices 130, as described below.

The OCLAuSL beam unit 110 of the OCLAuSL system 100 also includes an optical imaging system 118 under control of the controller 170. The optical imaging system is capable of imaging at least a portion of the build plane 190. In some embodiments, the optical imaging system 118 is capable of imaging the entire build plane 190, either in a single image or in successive images, whether discrete or continuously scanned. In particular, the optical imaging system 118 can be used to image an item within the build plane such as a test product being constructed, or a reference component or test pattern, or a mirror or other reference target with known optical properties. The controller 170 can then analyze the image or images of the build plane, test product, or reference object, and can make adjustments to parameters of the optic system 112 (e.g., brightness, focus, collimation, alignment, etc.), or parameters of the SLM 114

(e.g., contrast, brightness, grayscale properties of the image, etc.), or parameters of the beam delivery system 116 (e.g., focus, alignment, image positioning, etc.). In this way the optical imaging system 118 can be used to calibrate the OCLAuSL system 100, either before fabrication of a new product, or in real time or near-real time during fabrication of the product.

Before continuing, it should be noted that the examples described above are provided for purposes of illustration, and are not intended to be limiting. Other devices and/or device configurations may be utilized to carry out the operations described herein.

Figure 2:
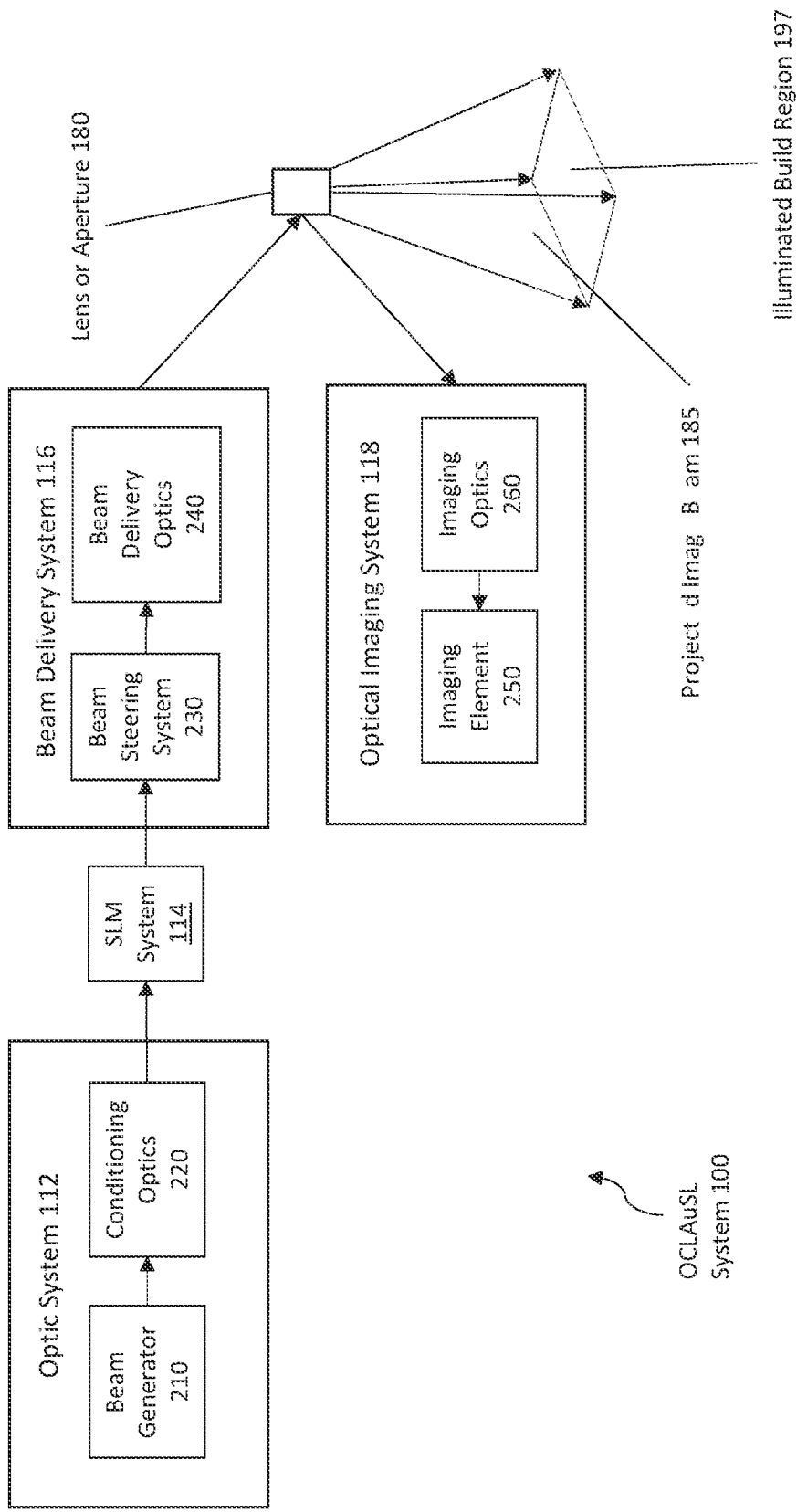
FIG. 2 is a schematic representation of at least a portion of an example OCLAuSL system, in accordance with at least one embodiment of the present disclosure.

FIG. 2 is a schematic representation of at least a portion of an example OCLAuSL system 100, in accordance with at least one embodiment of the present disclosure. OCLAuSL system 100 includes an optic system 112, a spatial light modulator (SLM) system 114, a beam delivery system 116, and an optical imaging system 118.

The beam delivery system 116 projects an image beam 185 onto a selected build region 197. In an example, the projected image beam 185 contains all the wavelengths of light generated by the optic system 112. In other examples, the projected image beam contains only selected wavelengths of the light generated by the optic system 112 (for example, those actinic wavelengths most suited to curing the photosensitive resin in the build plane).

The optical imaging system is capable of imaging the selected build region. In some embodiments, the optical imaging system images the selected build region 197 using reflected light from the projected image beam. In other embodiments, the optical imaging system illuminates the selected build region 197 with a different portion of the light generated by the optic system (for example, those non-actinic wavelengths les suited to curing the photosensitive resin, or most suited to imaging selected features in the build plane).

The optic system 112 may for example include a beam generator 210 and conditioning optics 220. The beam generator 210 may for example be or include a light emitting diode (LED), a superluminescent diode (SLD), a laser, a halogen bulb or other incandescent source, a xenon flash lamp or other electric arc source, a limelight or other candoluminescent source, or other light-generating components known in the art, including combinations thereof. In some embodiments, the light may be conditioned such that it comprises Kohler illumination. The beam generator 210 may generate light of a single wavelength, or a narrow range of wavelengths, or a broad range of wavelengths, or multiple ranges of wavelengths. Emitted wavelengths may include infrared, visible, and ultraviolet wavelengths. The optic system 112 may also include conditioning optics 220. The conditioning optics 220 may for example include a collimator (e.g., to tighten the beam), beam homogenizer, a beam expander (to match the size of the beam to the size of the SLM 114), one or more filters (to transmit certain wavelengths of light, such as actinic wavelengths capable of initiating photochemical reactions, while reflecting or absorbing other wavelengths, such as non-actinic wavelengths), one or more mirrors, one or more lenses, one or more beam splitters, one or more pupils, one or more shutters, one or more beam expanders or beam reducers, and/or other optics known in the art as needed to direct the generated light onto the SLM system 114 and/or to illuminate the selected build region 197 for the optical imaging system. The conditioning optics 220 may also include one or more sensors capable of monitoring the status of the beam (e.g., brightness, alignment, etc.).

The beam delivery system 116 may for example include a beam steering system 230 and beam delivery optics 240. The beam steering system 230 may for example be or include a steerable mirror, such as a spinning polygonal mirror. In an example, the beam steering system is a micro-actuated mirror with an accuracy of 10 microns or better, configured to deliver the SLM image to the proper place in the resin bath under control of the controller 170 (see FIG. 1). In some embodiments, the beam steering system comprises one or more galvanometer mirrors that are discretely or continuously steerable over two dimensions, and may be operable by one or more stepper motors or servo motors. In some embodiments, the beam steering system may be a single mirror that is steerable over two dimensions.

The beam delivery system 116 may also include beam delivery optics 240. The beam delivery optics 240 may for example include one or more mirrors, one or more beam expanders or beam reducers (e.g., to match the size of the projected image beam 185 to the size of the selected build region 197), one or more focusing lenses (e.g., to ensure that the focal plane of the projected image beam 185 is coplanar with the selected build region 197), one or more apertures, one or more scan lenses (e.g., flat field scan lenses), and/or other optics known in the art as needed to deliver the projected image beam 185 from the beam steering system 230 to the selected build region 197. The build plane occurs at the top layer of a bath of photo-curable material, and exposes or cures the desired pattern into the material, as described below, or it may expose from below through a transparent medium (e.g., a window), curing the desired pattern from below.

The optical imaging system 118 may for example include an imaging element 250 such as a charge coupled device (CCD) array or complementary metal oxide semiconductor (CMOS) camera, as well as imaging optics 260. The imaging optics 260 may include lenses, mirrors, beam splitters, shutters, pupils, and other optical components as will be understood by a person of ordinary skill in the art, that serve the function of delivering an accurate image of the build plane 190 or the current build region 197 to the imaging element 250 so that an accurate image can be captured by the imaging element 250 and analyzed (e.g., by the controller 170 of FIG. 1).

In some embodiments, the optical imaging system 118 and the beam delivery system 116 may include a common lens or aperture 180. In other embodiments, the optical imaging system 118 and the beam delivery system 116 each include their own separate lenses or apertures 180.

The OCLAuSL system 100 may also include other optical components in other locations (e.g., between the SLM 114 and the beam steering system 230, etc.) as needed or as may occur to a person of ordinary skill in the art to direct and align the beam. For example, the conditioning optics 220, beam delivery optics 240, and/or imaging optics 260 may be or may include a beamsplitter capable of: (i) accepting the modulated illumination light from the SLM system 114 and directing the modulated illumination light to the selected build region 197 of the build plane 190; and (ii) accepting imaging light from the build plane, and directing the imaging light to the optical imaging system 118. Such configurations, and others, fall within the scope of the present disclosure.

Figure 3:
FIG. 3 shows a flow diagram of an example OCLAuSL method, in accordance with at least one embodiment of the present disclosure.

FIG. 3 shows a flow diagram of an example optically calibrated, large-area microstereolithography (OCLAuSL) method 300, in accordance with at least one embodiment of the present disclosure. The elevator motion, beam on/off, and imaging display are controlled and synchronized by the computer, controller, or processor.

In step 310, the method 300 includes creating a 3D model of a desired object or product. This may be done for example using computer aided design (CAD), through 3D scanning of an example of the desired object or product, or by other means known in the art.

In step 320, the method 300 includes dividing the 3D model into a plurality of slices. The number of slices may for example determine the Z-resolution or Z-voxel size with which the desired object or product will be produced by the OCLAuSL system. For example, if the desired object or product is 100 millimeters tall, then subdividing it into 1,000 slices will result in a minimum feature size of 100 microns along the Z-axis.

In step 330, the method 300 includes subdividing a currently selected slice into slice regions. The slice may for example be subdivided into one, two, three, four, five, six, seven, eight, nine, ten, twenty, thirty, forty, fifty, sixty, seventy, eighty, ninety, one hundred, one thousand, ten thousand, or more slice regions. The slice regions may be of the same or similar size, or may be of different sizes. The slice regions may abut, may overlap, or may include a gap between neighboring slice regions.

In step 340, the method 300 includes sending a selected slice region to the spatial light modulator (SLM), such that the SLM generates an image of the selected slice region within the light beam produced by the optic system. In some examples, the brightness of each pixel of the SLM image may have only two possible values—on or off. In other examples, the brightness of each pixel of the SLM image may fall into a grayscale of, for example, 8, 16, 128, 256, 512, 1024, or more possible values, with larger values representing brighter pixels and smaller values representing dimmer pixels, or vice-versa.

In step 350, the method 300 includes sending the SLM image to the adjustable beam delivery system.

In step 360, the method 300 includes instructing the adjustable beam delivery system to direct the SLM image onto a selected build region of the build plane whose position within the build plane corresponds to the position of the selected slice region within the selected 2D slice. The projected image is in focus at the build plane, which contains a photocurable resin or liquid, such that the actinic light forms certain shapes or patterns within the material. This will expose the SLM image into the photosensitive liquid resin at this location, solidifying portions (e.g., voxels or groups of voxels) of the resin where the SLM image is bright and leaving unchanged the portions of the liquid resin there the SLM image is dark. Brighter pixels will result in greater exposure of the resin and thus more cross-linking at that particular voxel within the build plane. Greater cross-linking may be associated with a denser and/or stiffer voxel of solidified resin, whereas less cross-linking may be associated with a less dense and/or more flexible voxel of solidified resin. When the cross-linking is complete, or at least sufficient for the pattern in the exposed region to retain its integrity, execution proceeds to step 370.

In step 370, the method 300 includes selecting the next slice region within the selected slice. Execution then returns to step 340. However, if all slice regions of the current slice have been imaged onto the build plane, then there is no next slice region, and execution proceeds to step 380.

In step 380, the method 300 includes lowering the elevator platform within the resin bath. The elevator platform and resin bath are shown for example in FIG. 6. Lowering the elevator platform also lowers the current slice into a deeper level of the resin bath, and permits fresh resin to flow into the build plane. In some cases, the elevator platform is lowered by a Z-distance equal to the thickness of the current slice. In other examples, sometimes referred to as "dunking", the elevator platform is lowered by a larger amount, and then raised to a Z-distance equal to the thickness of the current slice. Dunking permits clean resin, unpolluted by cross-linking byproducts, to flow into the build plane.

In step 390, the method 300 includes selecting the next slice in the 3D model. Execution then returns to step 330. However, if all the slices in the 3D model have previously been selected, then there is no next slice, and execution proceeds to step 395.

In step 395, the fabrication of the desired object or product is complete. In other words, the layer-by-layer process defined above has continued until a completed 3D object is fabricated.

It is understood that the steps of method 300 may be performed in a different order than shown in FIG. 3, additional steps can be provided before, during, and after the steps, and/or some of the steps described can be replaced or eliminated in other embodiments. One or more of steps of the method 300 can be carried by one or more devices and/or systems described herein, such as components of the controller 170 (see FIG. 1) and/or processor circuit 850 (see FIG. 8).

Figure 4:
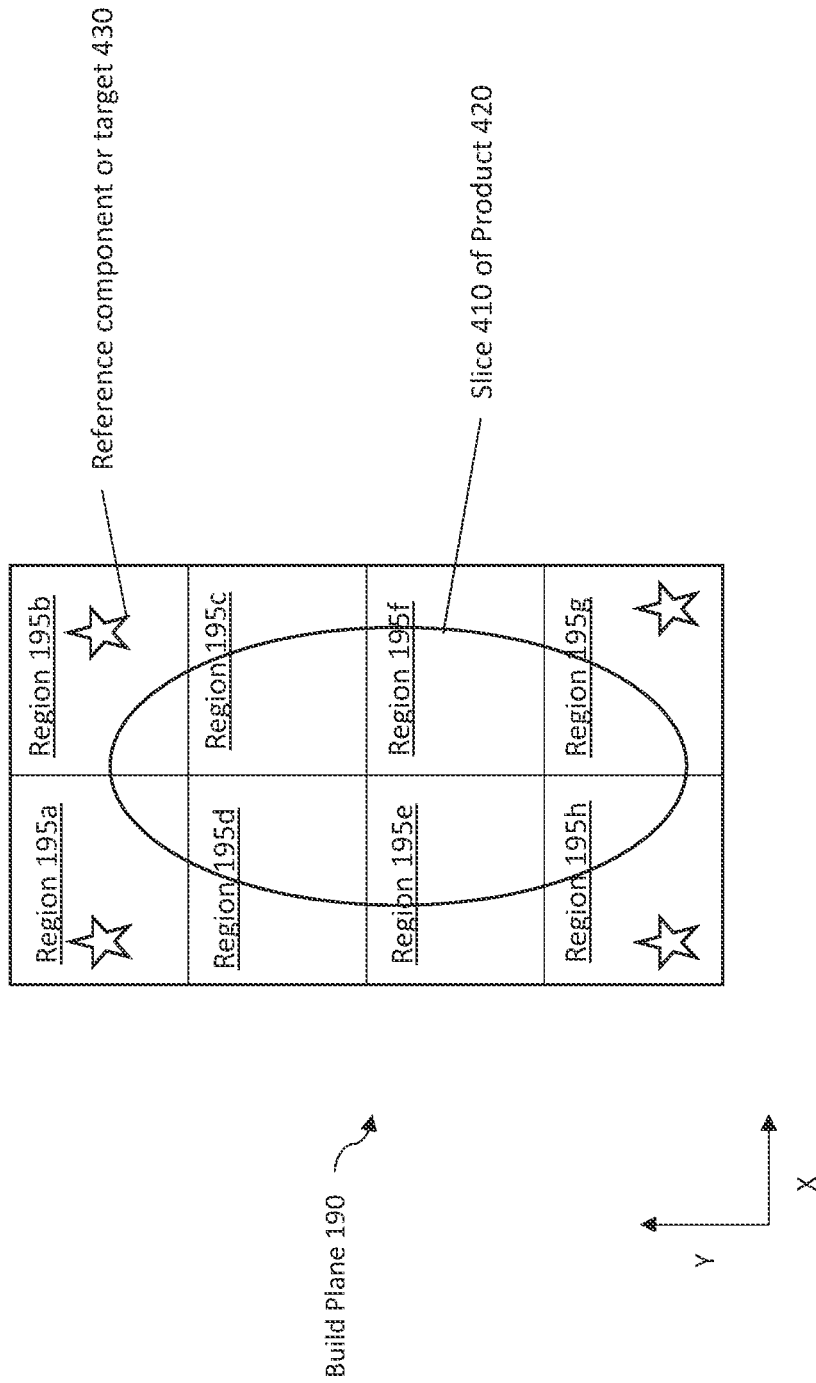
FIG. 4 is a schematic representation of at least a portion of the build plane of an example OCLAuSL system, in accordance with at least one embodiment of the present disclosure.

FIG. 4 is a schematic representation of at least a portion of the build plane 190 of an example OCLAuSL system, in accordance with at least one embodiment of the present disclosure. In the example shown in FIG. 4, the build plane 190 is subdivided into eight build regions 195*a*-195*g*. Spanning portions of all eight build regions is a product slice 410 of a product 420 being fabricated by the OCLAuSL system. The product slice 410 may for example comprise a plurality of regions or voxels of exposed, cross-linked, solidified resin, such that a plurality if stacked product slices 410 make up the finished product 420.

In the example shown in FIG. 4, the build plane 190 also includes four reference components, targets, test substrates, or test patterns 430 that may be imaged by the optical imaging system 118 (See FIG. 1) to facilitate calibration of the OCLAuSL system by the controller 170 (See FIG. 1). In some embodiments, the reference components, targets, or test patterns 430 may be constructed within the build plane along with the product slice 410, e.g., by projecting them onto the build plane using actinic wavelengths of light capable of exposing or cross-linking the resin. In other embodiments, the reference components, targets, or test patterns 430 may be placed within the build plane, or may be projected onto the build plane using wavelengths of light incapable of exposing or cross-linking the resin. Reference targets or test patters may for example, have radial symmetry (e.g., dots), may have features of varying spatial frequency (e.g., line pairs of different widths), may have features of varying spatial frequency at different orientations (e.g., a spoke target), or may include recognizable text, symbols, or other features known in the art, including combinations thereof. The number, size, shape, position, orientation, and other properties of the reference components, targets, or test patterns 430 may be different than shown or described herein, without departing from the spirit of the present disclosure.

In an example, beam movement is minimized if the regions 195, as shown in FIG. 4, are exposed in alphabetical order: 195*a*, 195*b*, 195*c*, 195*d*, 195*e*, 195*f*, 195*g*, and finally 195*h*. Depending on the implementation, it may be found that other orders are more efficient, such as a-d-e-h-g-f-c-b or any other possible order. Other continuous or discrete exposure patterns may also be desirable, including circles or spirals that minimize required beam movement and/or total exposure time required to complete a layer. More generally, the exposure pattern may be chosen so as to minimize the time required to move an optical element that refocuses the projection between subsequent exposures. The spiral pattern is an example of this, because the refocusing element doesn't have to move as far. Alternatively, the exposure pattern may be chosen so as to minimize the average or maximum time between exposure of any given tile and exposure of its adjacent or overlapping neighbors. A raster scan does a good job of this. In some cases, this can reduce the appearance of seams between adjacent or overlapping tiles. Other arrangements and optimizations, including combinations thereof, may be used instead or in addition.

The resolution and voxel size of the finished object or product 420 depend on the resolution of the SLM 114 (see FIGS. 1 and 2) and the size of each build region 195 within the build plane 190. Similarly, the maximum size of the finished object or product 420 depends on the number and arrangement of build regions, as well as their size. For example, if each of the eight build regions 195 shown in FIG. 4 is 1024×768 millimeters in size, and the resolution of the SLM 114 is 1024×768 pixels, then the voxel size in the build plane will be 1×1 mm, and the total area of the build plane will be 2048×3072 mm, and can be increased by adding new build regions. Similarly, reducing the dimensions of the build plane by 100×, without reducing the resolution of the SLM, would result in a maximum product size of 20.48 mm×30.72 mm, with a minimum feature size of 0.01 mm or 10 microns. The size of the build plane is decoupled from the size of the build region, so that one can in principle cover any size build plane with any size build region. Thus, by controlling the magnification of the image beam and the size and number of build regions 195 in the build plane 190, a user can build products with any desired size and resolution, limited only by optical diffraction limits, vibration tolerances, limits to beam alignment, and other practical constraints that will be understood by a person of ordinary skill in the art.

Figure 5:
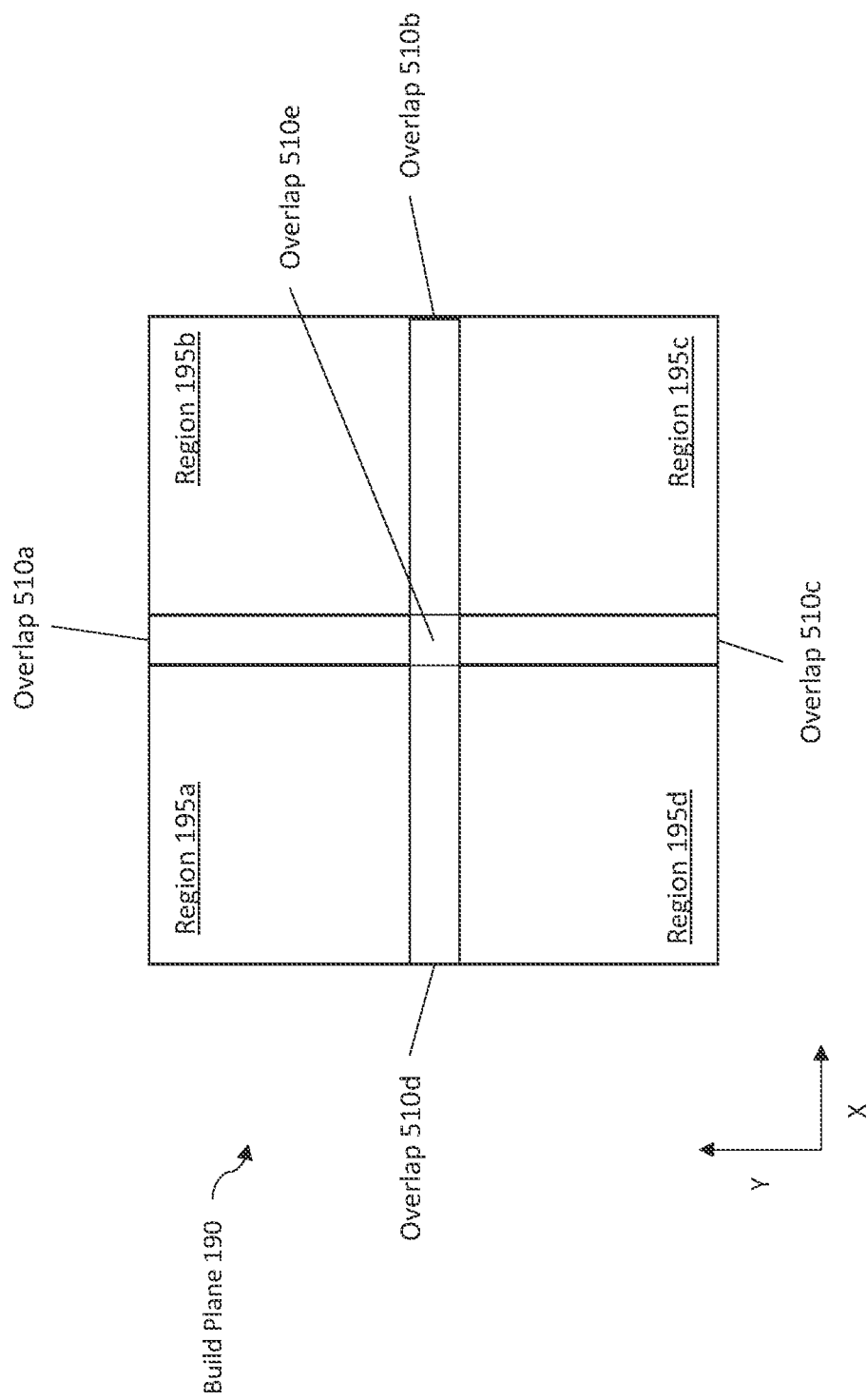
FIG. 5 is a schematic representation of at least a portion of the build plane of an example OCLAuSL system, in accordance with at least one embodiment of the present disclosure.

FIG. 5 is a schematic representation of at least a portion of the build plane 190 of an example OCLAuSL system, in accordance with at least one embodiment of the present disclosure. Visible are the build regions 195a, 195b, 195c, and 195d. In the example shown in FIG. 5, these build regions overlap, such that there is an overlap region 510a that includes portions of both build region 195a and build region 195b, an overlap region 510b that includes portions of build regions 195b and 195c, an overlap region 510c that includes portions of build regions 195c and 195d, an overlap region 510d that includes portions of build regions 195d and 195a, and an overlap portion 510e that includes portions of build regions 195a, 195b, 195c and 195d. When build regions abut, or when a gap exists between two build regions, a seam may be created (whether inadvertently or deliberately) in the finished product. Conversely, when build regions overlap, assuming proper registration between build regions, seams may be minimized or eliminated, and thus the overall quality of the product may be (or may be perceived as) greater than if seams are present.

Figure 6:
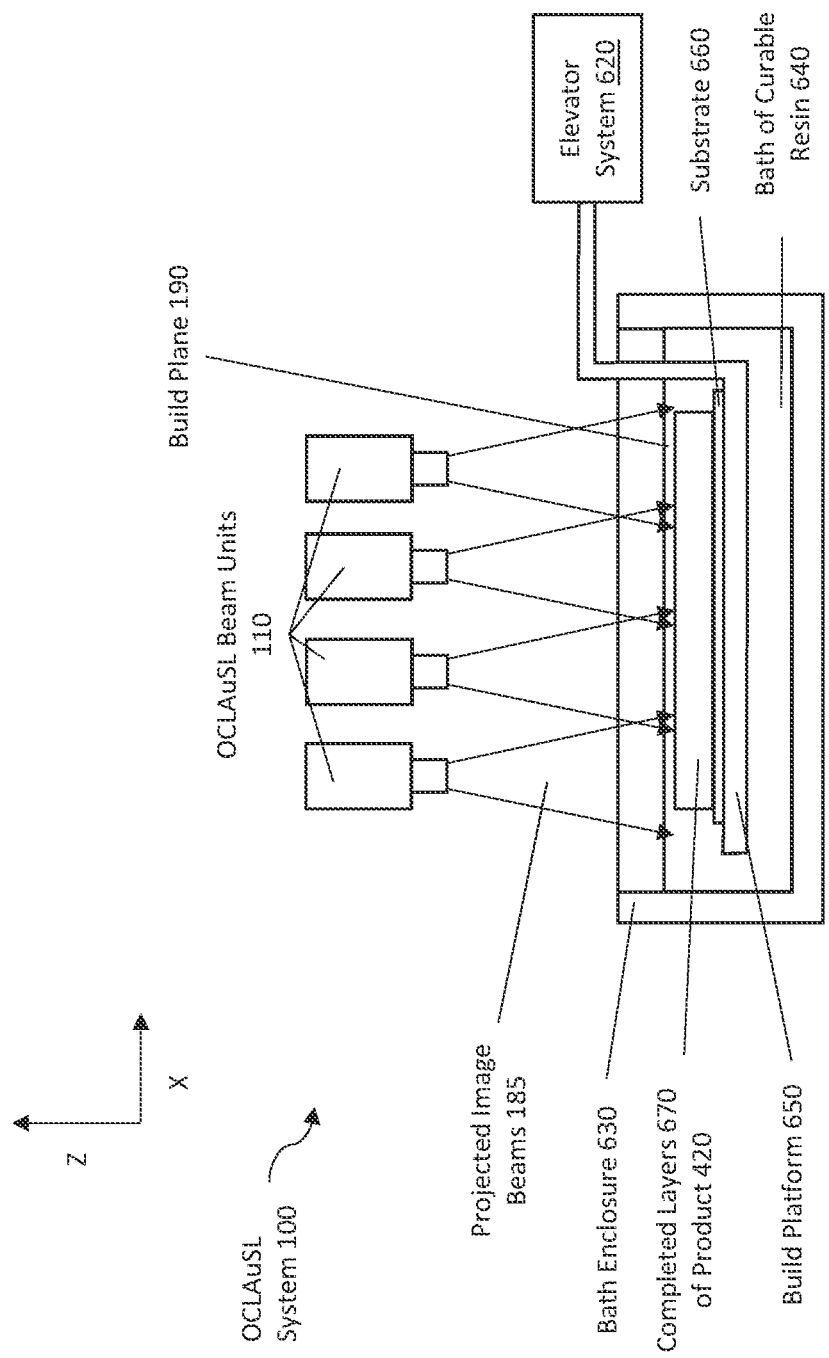
FIG. 6 is a schematic, side cross-sectional view of at least a portion of an example OCLAuSL system, in accordance with at least one embodiment of the present disclosure.

FIG. 6 is a schematic, side cross-sectional view of at least a portion of an example OCLAuSL system 100, in accordance with at least one embodiment of the present disclosure. Visible are OCLAuSL beam units 110, projected image beams 185, an elevator system 620, and a bath of photocurable resin 640 positioned within a bath enclosure 640. Within the resin bath 640 are a build platform 650 connected to the elevator system 620, a substrate disposed on top of the build platform, and completed layers 670 of the desired object or product 420. Other arrangements are also possible and fall within the scope of the present disclosure.

The OCLAuSL system 100 can be improved by ganging multiple OCLAuSL beam units 110 together to produce an ultra large area projection microstereolithography system. Such ganging enables essentially limitless increase in the size of objects that can be fabricated by the system. The images exposed into the build plane by the two or more beam units 110 are coordinated together to utilize the larger overall area. With two beam units 110, the area covered is 2× minus the overlap area. Similarly, if three beam units 110 are combined they can cover 3× minus the overlap area, and so on. In this way larger and larger products can be manufactured.

In the non-limiting embodiment shown in FIG. 6, four OCLAuSL beam units 110 have been ganged together in such a way that their projected image beams 185 overlap slightly within the build plane 190. In some embodiments, the OCLAuSL beam units 110 may be controlled by a single controller 170 (see FIG. 1) such that their actions coordinate to form a 2D slice 410 of the desired product 420 within the build plane 190. In other embodiments, each OCLAuSL beam unit 110 may be controlled its own controller 170, with the controllers 170 coordinating their activities to achieve a comparable level of coordination. Other arrangements are also possible and fall within the scope of the present disclosure.

As can be seen in FIG. 6, the build plane 190 is positioned at the top portion of a bath of photocurable resin 640. The bath of photocurable resin may be tens or hundreds of centimeters long, wide, or deep, or may be other sizes both larger and smaller.

In a non-limiting example, the main resin components may include: a monomer or polymer such as polyethylene glycol diacrylate (PEGDA, molecular weights over 575, specifically 575-6000), and/or gelatin methacrylate (GelMA); a photoinitiator such as lithium phenyl-2,4,6-trimethylbenzoylphosphinate (LAP), Irgacure 2959, and/or ruthenium; an absorber such as tartrazine; and a diluent such as PBS and/or water. Typical formulations may include 10-50 wt % of PEGDA (either mixture of single PEGDA of molecular weight 700-6000) or 10-25 wt % GelMA, 2-68 milliMoles (mM) LAP, 2-20 mM tartrazine, with the remaining wt % comprising water. One example formulation that has been shown to work well is 40 wt % PEGDA 6000, 34 mM LAP, 9 mM tartrazine, 15 wt % GelMA, 17 mM LAP, and 2.255 mM tartrazine. The term "resin" is to be interpreted broadly to include liquids, gels, solutions, suspensions, and colloids of plastic, monomeric based photocuring materials and/or softer, hydrophilic polymer based materials, or combinations thereof.

The disclosed apparatus and methods also provide an optically calibrated, large area micro stereolithography system for producing ceramic and/or metal parts. In an example, the beam delivery system projects and scans the layer images to a curable resin that includes metal or ceramic, whether suspended as particles, chemically bound as specialized molecules, or otherwise. The system then fabricates a desired object or product with a base polymer that contains metal or ceramic dispersed throughout the object. In some cases, this can result in a material with blended properties, such as an electrically conducting polymer or a polymer with higher than usual tensile or compressive strength. In other cases, the base polymer is subsequently removed by thermal decomposition, leaving behind a product made up of colloidal metal or ceramic particles. In some cases, these colloidal particles can be sintered to form a solid material.

In an example, the thickness of the build plane is (within reasonable mechanical tolerances expected by a skilled practitioner of the art) equal to the thickness of a slice 140 of the 3D model 120 (see FIG. 1). At the start of a product fabrication, the build plane 190 may be positioned between the substrate 660 and the top surface of the bath of photocurable resin 640, and may comprise a layer of liquid photocurable resin equal in thickness to the desired product slice 140.

Each time a new layer 670 is completed (e.g., fully cured, or at least partially cured enough for the newly created structures in the layer to maintain their integrity), the elevator system 620 moves the build platform 650 and substrate 660 downward in the resin bath by a distance equal to the thickness of the next slice 140. In some embodiments, all slices 140 are of equal thickness, but in other embodiments the slices 140 may be of varying thicknesses. In some embodiments, the elevator system 620 "dunks" the build platform 650, substrate 660, and completed layers 670 by lowering them in the z-direction by a distance greater than the desired slice thickness (e.g., 10 times, 100 times, 1000 times, or 10,000 times the slice thickness, or other values both larger and smaller), and then raised them to the height of the desired slice thickness. In some cases, photocuring of a product layer 670 produces chemical byproducts or impurities (including but not limited to oxidants, radicals, microscopic particles of partially cross-linked resin, and side reaction) that may interfere with photocuring of the next layer. This dunking process may help disperse such byproducts or impurities within the resin bath, and ensure that the build plane 190 is occupied by a clean layer of unreacted resin. The above describes a top-down system. It is to be understood that the present disclosure also includes bottom-up and sideways embodiments with appropriately oriented elevator systems.

In some embodiments, the elevator may be coupled to the build platform by an arm hanging over the edge of the vat, or by a post or set of shafts passing through the bottom of the vat. In some examples, the shafts may pass through o-rings or other seals to prevent resin from leaking around them. In some embodiments, the elevator system includes a stage that is movable on the Z-axis using servo or stepper motor under the control of a processor, such as the controller 170 of FIG. 1.

Figure 7:
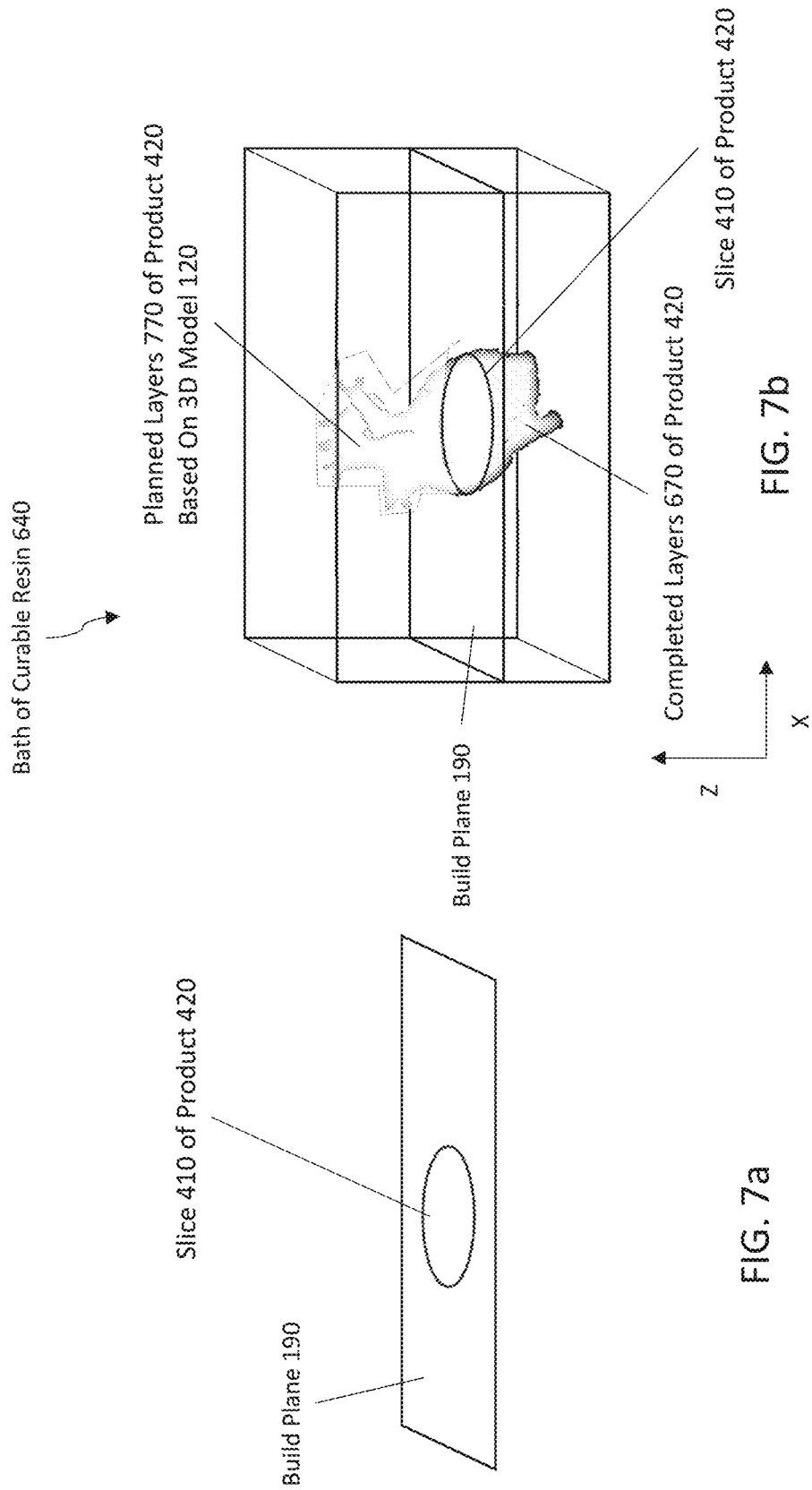
FIG. 7a is a perspective view of at least a portion of the build plane of an example OCLAuSL system, in accordance with at least one embodiment of the present disclosure.
FIG. 7b is a perspective view of at least a portion of the bath of curable resin of an example OCLAuSL system, in accordance with at least one embodiment of the present disclosure.

FIG. 7a is a perspective view of at least a portion of the build plane 190 of an example OCLAuSL system 100, in accordance with at least one embodiment of the present disclosure. Visible within the build plane 190 is a slice 410 of the desired object or product 420. The structure of the product slice 410 mimics the structure of a particular model slice 140 of the 3D model 120 (see FIG. 1). The product slice 410 may be a continuous solid piece, or may be made of discrete solidified voxels or other structures that do not necessarily connect within the build plane. In this way, three-dimensional lattices, networks, foams, and other complex 3D shapes—including macroscopic shapes with microscopic structural features—can be formed as new patterns are exposed, layer by layer.

FIG. 7b is a perspective view of at least a portion of the bath of curable resin 640 of an example OCLAuSL system 100, in accordance with at least one embodiment of the present disclosure. Visible are the completed layers 670 of the desired object or product 420, along with the layer or slice 410 that is currently under production, which is positioned at the top of the completed layers 670. Also visible in FIG. 7b are the planned layers 770 of the desired object or product 420. These planned layers may represent the contents of the plurality of slices 130 of the 3D model 120, as shown for example in FIG. 1. The 3D model 120 of the desired object or product 420 may include a mixture of macroscopic and microscopic features, whether similar or dissimilar to one another.

Figure 8:
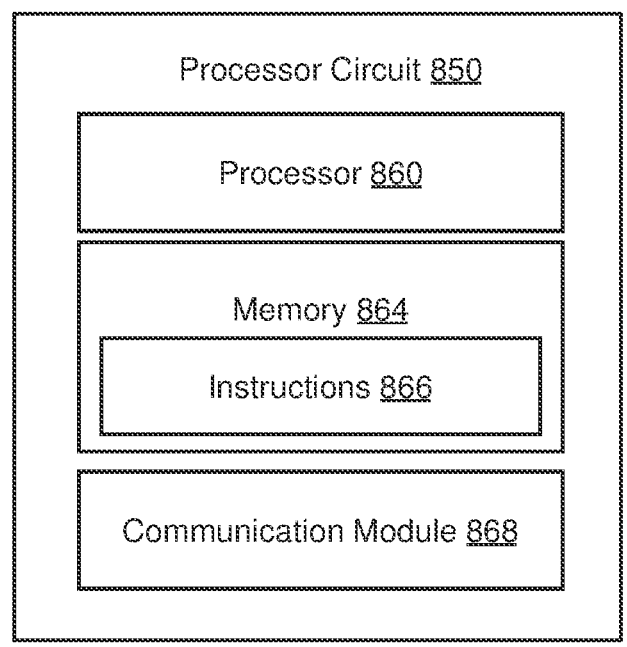
FIG. 8 is a schematic diagram of a processor circuit, according to embodiments of the present disclosure.

FIG. 8 is a schematic diagram of a processor circuit 850, according to embodiments of the present disclosure. The processor circuit 850 may for example be implemented in the controller 170 of the OCLAuSL beam unit 110 (see FIG. 1), or in other devices or workstations (e.g., third-party workstations, network routers, etc.), or on a cloud processor or other remote processing unit, as necessary to implement the method. As shown, the processor circuit 850 may include a processor 860, a memory 864, and a communication module 868. These elements may be in direct or indirect communication with each other, for example via one or more buses.

The processor 860 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 860 may also comprise another hardware device, a firmware device, or any combination thereof configured to perform the operations described herein. The processor 860 may also be implemented as a combination of computing devices, e.g., a combination of a DSP and a microprocessor, a plurality of microprocessors, one or more microprocessors in conjunction with a DSP core, or any other such configuration.

The memory 864 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 864 includes a non-transitory computer-readable medium. The memory 864 may store instructions 866. The instructions 866 may include instructions that, when executed by the processor 860, cause the processor 860 to perform the operations described herein. Instructions 866 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 868 can include any electronic circuitry and/or logic circuitry to facilitate direct or indirect communication of data between the processor circuit 850, and other processors or devices. In that regard, the communication module 868 can be an input/output (I/O) device. In some instances, the communication module 868 facilitates direct or indirect communication between various elements of the processor circuit 850 and/or the controller 170 (see FIG. 1). The communication module 868 may communicate within the processor circuit 850 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 9:
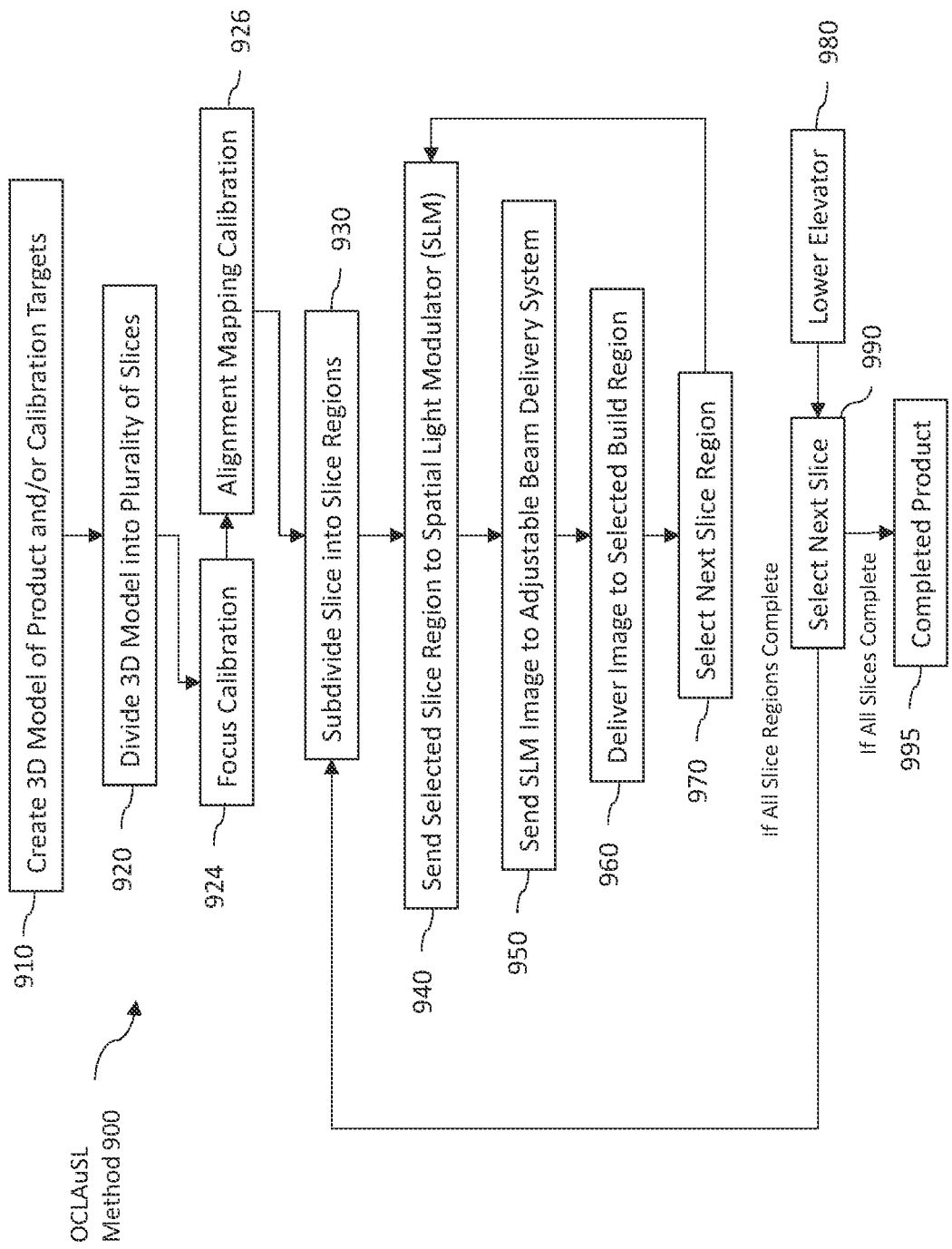
FIG. 9 shows a flow diagram of an example optically calibrated, large-area microstereolithography (OCLAuSL) method, in accordance with at least one embodiment of the present disclosure.

FIG. 9 shows a flow diagram of an example optically calibrated, large-area microstereolithography (OCLAuSL) method 900, in accordance with at least one embodiment of the present disclosure. The elevator motion, beam on/off, and imaging display are controlled and synchronized by the computer, controller, or processor.

In step 910, the method 900 includes creating a 3D model of a desired object or product. This may be done for example using computer aided design (CAD), or through 3D scanning of an example of the desired object or product.

In step 920, the method 900 includes dividing the 3D model into a plurality of slices. The number of slices may for example determine the Z-resolution or Z-voxel size with which the desired object or product will be produced by the OCLAuSL system. For example, if the desired object or product is 100 millimeters tall, then subdividing it into 1,000 slices will result in a minimum feature size of 100 microns along the Z-axis.

In step 924, the method 900 includes optionally performing a focus calibration procedure for the optic system, SLM system, and/or beam delivery system. The focus calibration procedure ensures that the projected image beam 185 is properly focused on the build plane, and may also ensure that the projected image beam is equally well focused in all locations of the build plane.

In step 926, the method 900 includes optionally performing an alignment mapping calibration 926 for the SLM system and/or the beam delivery system. The alignment mapping procedure ensures that when the projected image beam is directed to a particular X-Y location within the build plane, the alignment of the beam is such that it accurately moves to the commanded location.

In step 930, the method 900 includes subdividing a currently selected into slice regions. The slice may for example be subdivided into one, two, three, four, five, six, seven, eight, nine, ten, twenty, thirty, forty, fifty, sixty, seventy, eighty, ninety, one hundred, or more slice regions. The slice regions may be of the same or similar size, or may be of different sizes. The slice regions may abut, may overlap, or may include a gap between neighboring slice regions.

In step 940, the method 900 includes sending a selected slice region to the spatial light modulator (SLM), such that the SLM generates an image of the selected slice region within the light beam produced by the optic system. In some examples, the brightness of each pixel of the SLM image may have only two possible values—on or off. In other examples, the brightness of each pixel of the SLM image may fall into a grayscale of, for example, 8, 16, 32, 64, 128, 256, 512, 1024, or more possible values, with larger values representing brighter pixels and smaller values representing dimmer pixels.

In step 950, the method 900 includes sending the SLM image to the adjustable beam delivery system.

In step 960, the method 900 includes instructing the adjustable beam delivery system to direct the SLM image onto a selected build region of the build plane whose position within the build plane corresponds to the position of the selected slice region within the selected 2D slice. The projected image is in focus at the build plane, which contains a photocurable resin or liquid, such that the actinic light forms certain shapes or patterns within the material. This will expose the SLM image into the photosensitive liquid resin at this location, solidifying portions of the resin where the SLM image is bright and leaving unchanged the portions of the liquid resin there the SLM image is dark. Brighter pixels will result in greater exposure of the resin and thus more cross-linking at that particular voxel within the build plane. Greater cross-linking may be associated with a denser and/or stiffer voxel of solidified resin, whereas less cross-linking may be associated with a less dense and/or more flexible voxel of solidified resin. When the cross-linking is complete, or at least sufficient for the pattern in the exposed region to retain its integrity, execution proceeds to step 970.

In step 970, the method 900 includes selecting the next slice region within the selected slice. Execution then returns to step 940. However, if all slice regions of the current slice have been imaged onto the build plane, then there is no next slice region, and execution proceeds to step 980.

In step 980, the method 900 includes lowering the elevator platform within the resin bath. The elevator platform and resin bath are shown for example in FIG. 6. Lowering the elevator platform also lowers the current slice into a deeper level of the resin bath, and permits fresh resin to flow into the build plane. In some cases, the elevator platform is lowered by a Z-distance equal to the thickness of the current slice. In other examples, sometimes referred to as "dunking", the elevator platform is lowered by a larger amount, and then raised to a Z-distance equal to the thickness of the current slice. Dunking permits clean resin, unpolluted by cross-linking byproducts, to flow into the build plane.

In step 990, the method 900 includes selecting the next slice in the 3D model. Execution then returns to step 930. However, if all the slices in the 3D model have previously been selected, then there is no next slice, and execution proceeds to step 995.

In step 995, the fabrication of the desired object or product is complete. In other words, the layer-by-layer process defined above has continued until a completed 3D object is fabricated.

It is understood that the steps of method 900 may be performed in a different order than shown in FIG. 9, additional steps can be provided before, during, and after the steps, and/or some of the steps described can be replaced or eliminated in other embodiments. One or more of steps of the method 900 can be carried by one or more devices and/or systems described herein, such as components of the controller 170 (see FIG. 1) and/or processor circuit 850 (See FIG. 8).

Figure 10:
FIG. 10 shows a flow diagram of an example optically calibrated, large-area microstereolithography (OCLAuSL) focus calibration method, in accordance with at least one embodiment of the present disclosure.

FIG. 10 shows a flow diagram of an example optically calibrated, large-area microstereolithography (OCLAuSL) focus calibration method 1000, in accordance with at least one embodiment of the present disclosure.

In step 1005, the method 1000 includes placing a reference target in the print plane. The reference target may for example be a luminescent, fluorescent, or reflective feature or test target produced by the OCLAuSL system at a desired location.

In step 1010, the method 1000 includes aiming the optical imaging system at the reference target.

In step 1020, the method 1000 includes capturing an image of the reference target using the optical imaging system.

In step 1030, the method 1000 includes analyzing the focus of the reference target. If the projected image beam is properly in focus at the build plane, then the voxels of the reference target may be approximately rectangular in shape, with well-defined edges, and of a particular expected size based on the resolution and expected minimum feature size of the OCLAuSL system's present configuration. Conversely, if the projected image beam is not in focus at the build plane, then the voxels of the reference target may be more circular or cylindrical in shape, with poorly defined edges and of a size larger than the expected minimum feature size.

In step 1040, the method 1000 includes adjusting the beam focus delivery parameters of the optic system, SLM system, and/or beam delivery system to ensure that the projected image beam is properly focused at the location of the reference target.

In step 1050, the system checks to see whether this is the last reference target. If not, execution proceeds to step 1060. If yes, execution proceeds to step 1070.

In step 1060, the method includes selecting the next reference target. Execution then returns to step 1010.

In step 1070, the focus calibration method 1070 is complete.

It is understood that the steps of method 1000 may be performed in a different order than shown in FIG. 10, additional steps can be provided before, during, and after the steps, and/or some of the steps described can be replaced or eliminated in other embodiments. One or more of steps of the method 1000 can be carried by one or more devices and/or systems described herein, such as components of the controller 170 (see FIG. 1) and/or processor circuit 850 (See FIG. 8).

Figure 11:
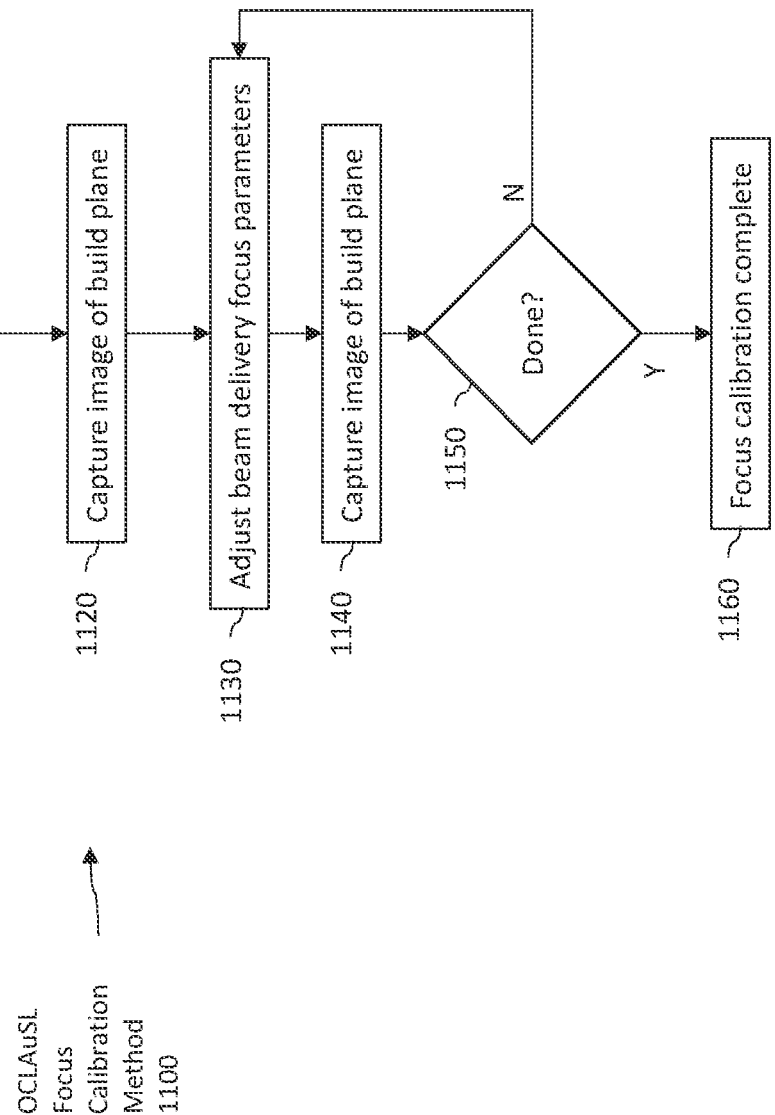
FIG. 11 shows a flow diagram of an example optically calibrated, large-area microstereolithography (OCLAuSL) focus calibration method, in accordance with at least one embodiment of the present disclosure.

FIG. 11 shows a flow diagram of an example optically calibrated, large-area microstereolithography (OCLAuSL) focus calibration method 1100, in accordance with at least one embodiment of the present disclosure.

In step 1110, the method includes projecting a test pattern onto the build plane using the optic system, SLM system, and beam delivery system of the OCLAuSL system. The test pattern may for example include features of known size and shape.

In step 1120, the method 1100 includes capturing an image of the build plane, including at least a portion of the projected test pattern, with the optical imaging system.

In step 1130, the method 1100 includes adjusting the beam delivery focus parameters in order to sharpen the focus of the test pattern projected by the OCLAuSL system. Depending on the implementation, this focusing procedure may be done either manually or automatically. If the projected image beam is properly in focus at the build plane, then the voxels of the test pattern may be approximately rectangular in shape, with well-defined edges, and of a particular expected size based on the resolution and expected minimum feature size of the OCLAuSL system's present configuration. Conversely, if the projected image beam is not in focus at the build plane, then the voxels of the test pattern may be more circular or cylindrical in shape, with poorly defined edges and of a size larger than the expected minimum feature size. In some cases, the best focus will still not yield sharp edges. In this case another metric for "best focus" may be used, such as for example the maximum contrast or maximum standard deviation of the image. Focus parameters of the projected image beam that may be adjusted include for example the depth of field (adjusted by narrowing or widening an aperture); numerical aperture (which helps to determine maximum sharpness, and is also adjusted by changing the aperture size); focal plane location along Z (adjusted by moving one or more optical elements); or focal plane tilt (adjusted by tilting the optical axis relative to the membrane or resin surface, or adjusted by tilting the DMD or other spatial light modulator).

In step 1140, the method 1100 includes capturing a second image of the build plane, including at least a portion of the projected test pattern, with the optical imaging system, for comparison against the previous image. In some embodiments, these images are taken continuously rather than at discrete intervals.

In step 1150, the method 1100 includes determining whether the focus of the test pattern projected by the OCLAuSL system is optimally (or at least acceptably) focused onto the build plane, as observed by the optical imaging system. If no, execution returns to step 1130. If yes, execution proceeds to step 1160.

In step 1160, the method 1100 is complete, and the projected image beam of the OCLAuSL beam is considered to be properly focused onto the build plane.

It is understood that the steps of method 1100 may be performed in a different order than shown in FIG. 11, additional steps can be provided before, during, and after the steps, and/or some of the steps described can be replaced or eliminated in other embodiments. One or more of steps of the method 1100 can be carried by one or more devices and/or systems described herein, such as components of the controller 170 (see FIG. 1) and/or processor circuit 850 (See FIG. 8).

Exact details of the method may vary, along with the hardware used to implement in. Some embodiments include focusing using the projection illumination using low total irradiance, such that the illumination does not cause polymerization. Other embodiments include focusing using another color of illumination that is also projected through the SLM. For example, this other color may be projected when the mirrors are in the "off" position, by illuminating the mirrors from a different angle than the primary polymerization illumination. In other embodiments, this other color may be projected by illuminating with a different color along the same axis, for example, using a beamsplitter or dichroic mirror to combine beams of two different colors. Still other embodiments include focusing the contrast of a spot or other shape or pattern projected through the OCLAuSL optics, where the spot or other shape or pattern has a spectrum such that it does not polymerize the resin. Focus may be optimized without direct measurement if the precise distance from the lens to the surface is known. The precise location of the resin or membrane surface may be measured using one or more contact or non-contact sensors. Also, the distance may be determined by illuminating with broadband illumination, either through the projection optics or otherwise, and analyzing the relative intensities of the wavelengths collected. Still other variations are possible as would occur to a person of ordinary skill in the art, and fall within the scope of the present disclosure.

Figure 12:
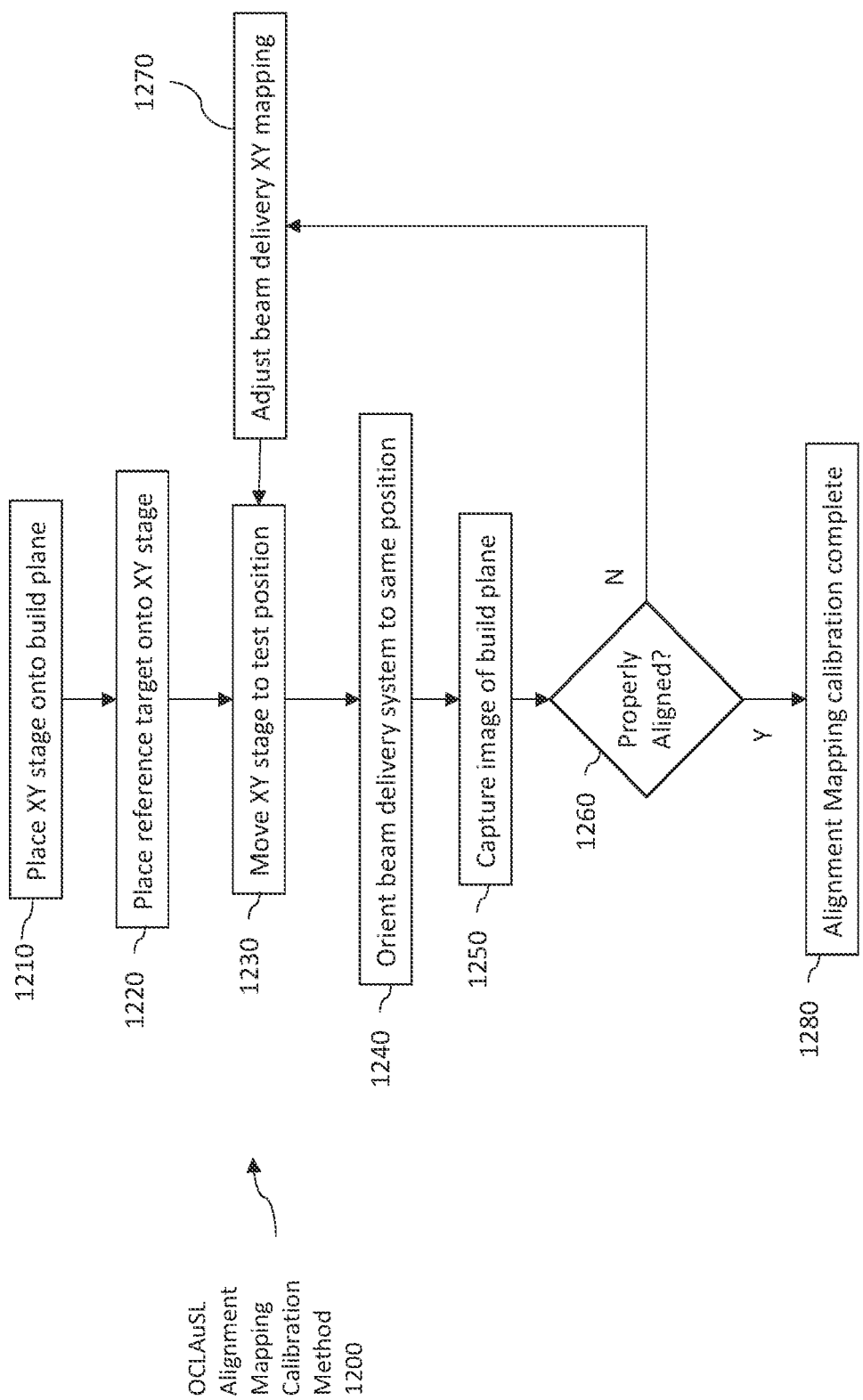
FIG. 12 shows a flow diagram of an example optically calibrated, large-area microstereolithography (OCLAuSL) alignment mapping calibration method, in accordance with at least one embodiment of the present disclosure.

FIG. 12 shows a flow diagram of an example optically calibrated, large-area microstereolithography (OCLAuSL) alignment mapping calibration method 1200, in accordance with at least one embodiment of the present disclosure.

In step 1210, the method 1200 includes placing an XY stage in or near the build plane of the OCLAuSL system, and aligned with the build plane. The XY stage may provide accurate movements in two directions within a given plane, such that the X and Y positions of any portion of the stage may be accurately known and accurately changed within the plane.

In step 1220, the method 1200 includes placing a reference target onto the XY stage, such that a top viewable surface of the reference target is within, and aligned with, the build plane. The reference target may for example be a photomask with known feature sizes and locations.

In step 1230, the method 1200 includes moving the XY stage to a particular test position.

In step 1240, the method 1200 includes reorienting the beam delivery system so that it aligns with the position of the XY stage. For example, the OCLAuSL system could aim a single illuminated pixel at a marker located in the center of the reference target, or four illuminated pixels at markers located at or near the corners of the reference target, or could project an image of the mask onto the mask itself, such that any mis-positioning or other misalignment of the projected mask can be clearly seen against the physical mask located on the XY stage.

In step 1250, the method includes capturing an image of the build plane with the optical imaging system. This image may for example include the reference target (e.g., a photomask) located on the XY stage within the build plane, as well as any illuminated pixels projected by the OCLAuSL system.

In step 1260, the method 1200 includes, with the captured image, checking the alignment of the illuminated pixels from the OCLAuSL system against the known positions of the markings on the reference marker located on the XY stage. If the positions of the illuminated pixels match (within acceptable engineering tolerances) the positions of the reference marks on the reference target, then the image beam is considered to be properly aligned, and execution proceeds to step 1280. If not, then execution proceeds to step 1270.

In step 1270, the OCLAuSL system adjusts the beam delivery system's XY mapping to compensate for any observed misalignment between the projected pixels from the OCLAuSL system and the reference marks on the reference target.

In other embodiments, the optical imaging system is included on the XY stage itself. The XY stage may in some cases be placed above or below the build plane, and may image a mask projected onto the build plane by the OCLAuSL system to achieve the same results described above. Thus, the method employs galvanometer mirror mapping using an XY stage with a camera on it to map the position command sent to the galvanometer mirror to the position of the projection and image, and mapping the XY stage itself, e.g., using the coaxial optics and a photomask with features of known dimensions. In this configuration the galvanometer mirrors are kept in one position. The mask is placed on the stage and translated below the camera. Other arrangements are also possible to achieve the same effect, and fall within the scope of the present application. For example, depending on the implementation, the XY stage may be replaced with an XZ stage, YZ stage, XYZ stage, or other movable stage.

It is understood that the steps of method 1200 may be performed in a different order than shown in FIG. 12, additional steps can be provided before, during, and after the steps, and/or some of the steps described can be replaced or eliminated in other embodiments. One or more of steps of the method 1200 can be carried by one or more devices and/or systems described herein, such as components of the controller 170 (see FIG. 1) and/or processor circuit 850 (See FIG. 8).

Figure 13:
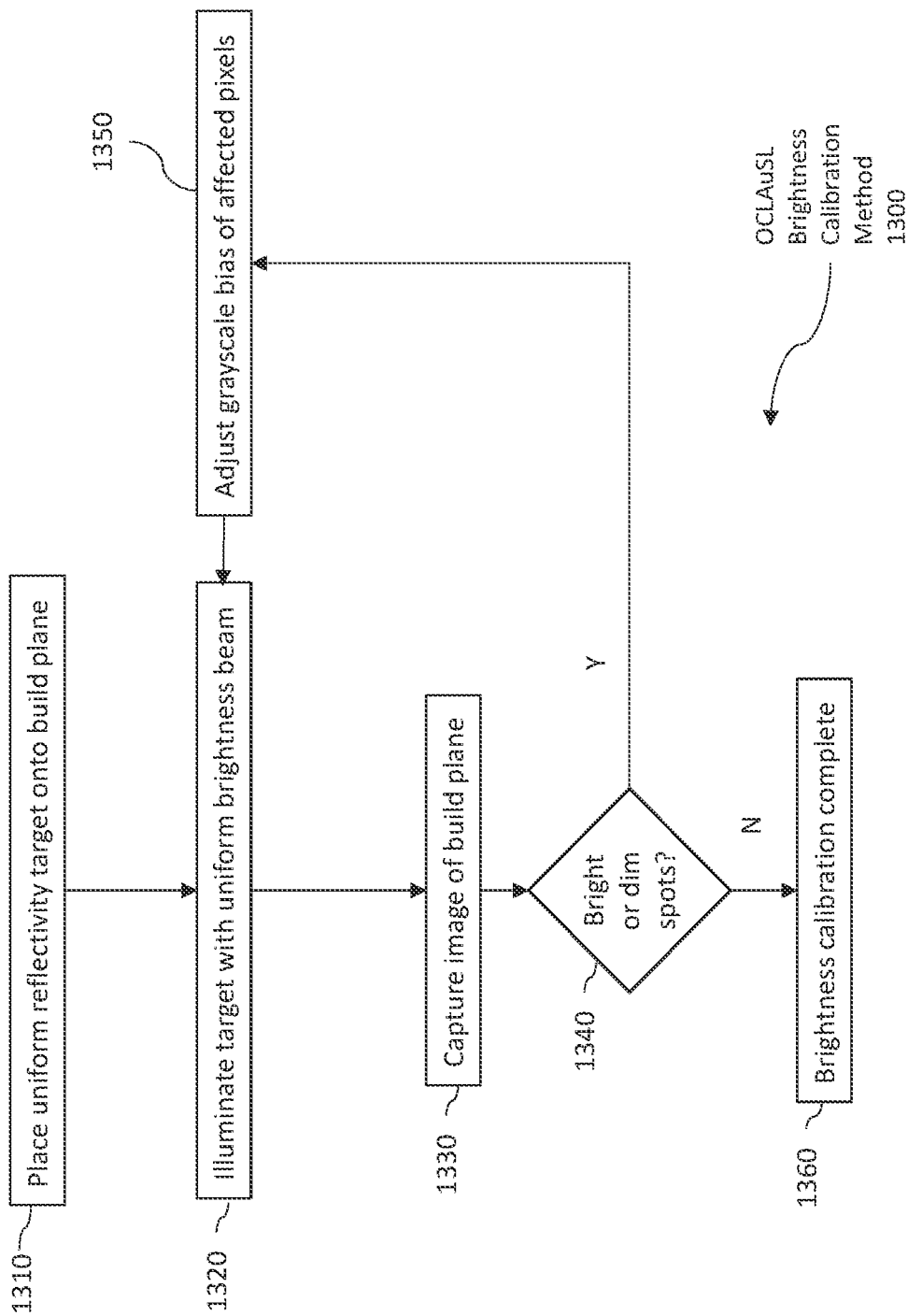
FIG. 13 shows a flow diagram of an example optically calibrated, large-area microstereolithography (OCLAuSL) brightness calibration method, in accordance with at least one embodiment of the present disclosure.

FIG. 13 shows a flow diagram of an example optically calibrated, large-area microstereolithography (OCLAuSL) brightness calibration method 1300, in accordance with at least one embodiment of the present disclosure.

In step 1310, the method 1300 includes placing a uniform reflectivity reference target onto the build plane. The reference target may for example cover the entire build plane, or a particular build region of the build plane, or may be smaller than a build region.

In step 1320, the method 1300 includes illuminating the reference target with a uniform brightness beam. The uniform brightness beam may for example be produced by sending an image from the SLM wherein every pixel is set to the middle of the grayscale range.

In step 1330, the method 1300 includes capturing an image of the build plane with the optical imaging system, such that at least a portion of the reference target is included in the image.

In step 1340, the method 1300 includes examining the captured image for bright or dark pixels, e.g., pixels whose brightness deviates from the expected level for a uniform brightness beam illuminating a uniform reflectivity target. If such bright or dim spots are found, execution proceeds to step 1350. If not, execution proceeds to step 1360.

In step 1350, the method 1300 includes adjusting the grayscle bias of the affected pixels so that, for example, instead of defaulting to the middle of the grayscale range, they default to a set number of increments higher or lower than the middle. Thus, any particular brightness commanded from that pixel will be offset by the bias, such that (for example) if the controller commands a beam of uniform brightness, the biased pixels will in face deliver the same brightness as the other pixels in the image, and thus the brightness of each pixel across the beam will be approximately equal. Execution then returns to step 1320.

In step 1360, then method 1300 is complete, and the brightness of the OCLAuSL system is assumed to be properly calculated.

In some embodiments, the reflectivity of the target and/or the brightness of the projected image beam may not be uniform, so long as the expected brightness of each projected and/or reflected pixel is known. It is understood that the steps of method 1300 may be performed in a different order than shown in FIG. 13, additional steps can be provided before, during, and after the steps, and/or some of the steps described can be replaced or eliminated in other embodiments. One or more of steps of the method 1200 can be carried by one or more devices and/or systems described herein, such as components of the controller 170 (see FIG. 1) and/or processor circuit 850 (See FIG. 8).

As will be readily appreciated by those having ordinary skill in the art after becoming familiar with the teachings herein, the optically calibrated, large-area microstereolithography system advantageously permits rapid, reliable, repeatable, fabrication of large objects (e.g., hundreds of millimeters or larger in size) with microscopic features (e.g., tens of microns or smaller in size), with few or no detectable seams and with pixelation occurring on a scale too fine to be perceived by the human eye. Accordingly, it can be seen that the optically calibrated, large-area microstereolithography system fills a need in the art, by providing a means to calibrate projected images, and the optics that produce them, in order to ensure a consistent size and curing level of voxels across the entire build plane, however large or small that may be.

A number of variations are possible on the examples and embodiments described above. For example, the build plane and/or resin bath may be larger or smaller than depicted herein. The resolution may be greater (or the voxel size may be smaller) than discussed herein, limited only by classical diffraction limits. Conversely, the technologies discussed herein may equally be applied to systems with extremely large build volumes and/or voxel sizes, for the production of industrial-scale components. Composition of the resin bath, and the corresponding actinic wavelengths capable of cross-linking the resin, may be different than disclosed herein. Cured resins may be transparent to infrared light, visible light, or ultraviolet light, or may be translucent or opaque, or combinations thereof. Resins may be or may include dye molecules or dye particles (including fluorescent molecules or particles) to confer any desired color or combination of colors to the finished part, including colors not perceivable by the human eye. The technology described herein may be employed to produce prototypes or finished goods (e.g., tools, housings, models, or components) for nearly any industry, including but not limited to medicine, art, science, manufacturing, agriculture, automotive, aerospace, and consumer electronics. Non-limiting examples include dental crowns and implants, biological scaffolds, implantable tissues and organs, supercapacitors, and food.

The logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the optically calibrated microstereolithography system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the optically calibrated microstereolithography system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

RECITATION OF VARIOUS EMBODIMENTS OF THE PRESENT DISCLOSURE

Embodiment 1: A method for calibrating a stereolithography system, the method comprising: placing a reference target into a build plane of the stereolithography system; with an optical imaging system of the stereolithography system, capturing an image of the reference target; with a processor of the stereolithography system, analyzing a focus level of the reference target based on the captured image; and based on the analyzing, adjusting a focus property of the projected image beam of the stereolithography system.

Embodiment 2: The method of embodiment 1, wherein analyzing the focus level of the reference target comprises analyzing a size, shape, edge definition, contrast, standard deviation, spatial frequency spectrum, or other metric derived from a relative intensity of pixels in the captured image.

Embodiment 3: The method of embodiment 1 or 2, wherein adjusting the focus property of the projected image beam comprises adjusting at least one of a depth of field, a numerical aperture, a sharpness, a focal plane location, or a focal plane tilt.

Embodiment 4: The method of any of embodiments 1-3, wherein the reference target is reflective.

Embodiment 5: A method for calibrating a stereolithography system, the method comprising: with a projected image beam of the stereolithography system, projecting a test pattern onto a build plane of the stereolithography system; with an optical imaging system of the stereolithography system, capturing an image of the test pattern; with a processor of the stereolithography system, analyzing a focus level of the test pattern based on the captured image; and based on the analyzing, adjusting a focus property of the projected image beam.

Embodiment 6: The method of embodiment 5, wherein analyzing the focus level of the test pattern comprises analyzing a size, shape, edge definition, contrast, standard deviation, spatial frequency spectrum, or other metric derived from a relative intensity of pixels in the captured image.

Embodiment 7: The method of embodiment 5 or 6, wherein adjusting the focus property of the projected image beam comprises adjusting at least one of a depth of field, a numerical aperture, a sharpness, a focal plane location, or a focal plane tilt.

Embodiment 8: The method of any of embodiments 5-7, wherein the projected image beam comprises a wavelength, irradiance, and exposure time selected such that the projected image beam does not cause polymerization of a photosensitive resin positioned at the build plane.

Embodiment 9: The method of embodiments 5-8, wherein the test pattern is a spot.

Embodiment 10: A method for calibrating a stereolithography system, the method comprising: placing movable stage proximate to a build plane of the stereolithography system; placing a reference target on the movable stage such that a viewable surface of the reference target is within, and aligned with, the build plane, wherein the reference target comprises markings; with a projected image beam of the stereolithography system, projecting illuminated pixels onto the build plane; with an optical imaging system of the stereolithography system, capturing an image of the illuminated pixels and the markings; with a processor of the stereolithography system, analyzing relative positions of the illuminated pixels and the markings; and based on the analyzing, adjusting an alignment property of the projected image beam.

Embodiment 11: The method of embodiment 10, wherein the reference target is a photomask.

Embodiment 12: A method for calibrating a stereolithography system, the method comprising: placing a reference target into a build plane of the stereolithography system; with a projected image beam of the stereolithography system, projecting pixels of a known intensity onto the build plane of the stereolithography system; with an optical imaging system of the stereolithography system, capturing an image of the pixels; with a processor of the stereolithography system, analyzing a brightness of the pixels in the image; and based on the analyzing, adjusting a grayscale bias property of the projected image beam.

Embodiment 13: The method of embodiment 12, wherein the reference target is reflective.

Embodiment 14: The method of embodiment 12 or 13, wherein the reference target is luminescent or fluorescent.

Embodiment 15: A method for calibrating a stereolithography system, the method comprising: with a projected image beam of the stereolithography system, creating a reference target in a build plane of the stereolithography system; with an optical imaging system of the stereolithography system, capturing an image of the reference target; with a processor of the stereolithography system, analyzing a focus level of the reference target based on the captured image; and based on the analyzing, adjusting a focus property of the projected image beam of the stereolithography system.

Embodiment 16: The method of embodiment 15, wherein analyzing the focus level of the reference target comprises analyzing a size, shape, edge definition, contrast, standard deviation, spatial frequency spectrum, or other metric derived from a relative intensity of pixels in the captured image.

Embodiment 17: The method of embodiment 15 or 16, wherein adjusting the focus property of the projected image beam comprises adjusting at least one of a depth of field, a numerical aperture, a sharpness, a focal plane location, or a focal plane tilt.

Embodiment 18: The method of any of embodiments 1-17, wherein the optical imaging system includes a camera positioned on a movable stage plane that is aligned with the build plane.

The invention claimed is:

1. A method for calibrating a stereolithography system, the method comprising:
   placing a reference target into a build plane of the stereolithography system;
   with an optical imaging system of the stereolithography system, capturing an image of the reference target;
   with a processor of the stereolithography system, analyzing, using the captured image, a focus level of the reference target, based on an expected minimum feature size and a three-dimensional (3D) shape of one or more voxels of the reference target; and
   based on the analyzing, adjusting a focus property of a projected image beam of the stereolithography system.

2. The method of claim 1, wherein analyzing the focus level of the reference target comprises analyzing a metric derived from a relative intensity of pixels in the captured image.

3. The method of claim 1, wherein adjusting the focus property of the projected image beam is adjusting of a depth of field, a numerical aperture, a sharpness, a focal plane location, or a focal plane tilt.

4. The method of claim 1, wherein the reference target is reflective.

5. The method of claim 1, wherein the optical imaging system includes a camera positioned on a movable stage plane that is aligned with the build plane.

* * * * *